H. BROWN.
Hay-Rake.
No. 56,000. Patented July 3, 1866.
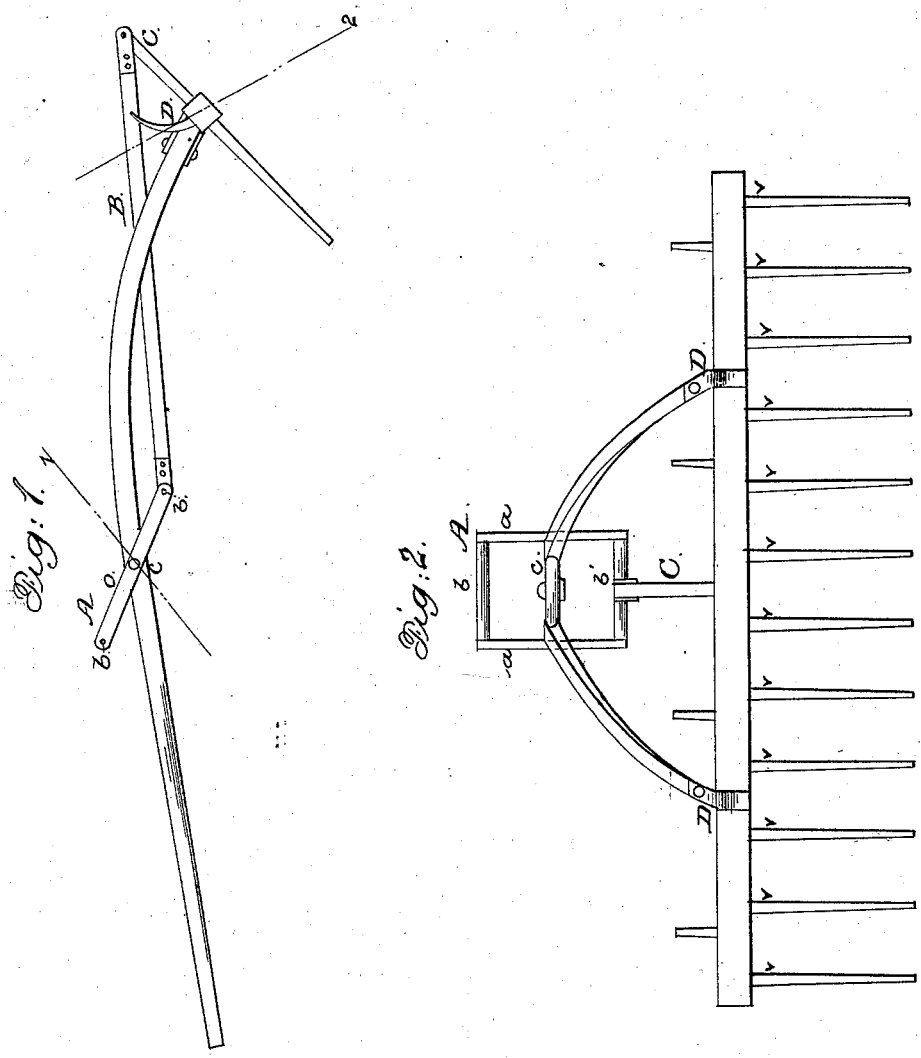

UNITED STATES PATENT OFFICE.

HIRAM BROWN, OF CAPE ELIZABETH, MAINE.

IMPROVEMENT IN HAY-RAKES.

Specification forming part of Letters Patent No. 56,000, dated July 3, 1866.

*To all whom it may concern:*

Be it known that I, HIRAM BROWN, of Cape Elizabeth, in the county of Cumberland and State of Maine, have invented a new and useful Improvement in Hand-Rakes; and I hereby declare the following to be a full, clear, and exact description thereof, which will enable others to make and use my invention, reference being had to the accompanying drawings, forming part of this specification, in which—

Figure 1 shows a side view of a hand-rake with my improvement attached; Fig. 2, an end view of the same.

The same letters indicate like parts in each of the figures.

The red lines in Fig. 1 illustrate the movement of the rake-teeth and of a portion of my improvement.

The object of my invention is to produce a convenient and easy means of relieving a rake from its load when the teeth are filled and the hay thus collected is to be deposited in the windrow.

It consists in a lever in the form of a frame attached to the handle of the rake, and an arm reaching from this to the rake head or teeth, for the purpose of turning the head or teeth, so as to leave the hay at any desired place easily and promptly. The most usual method of accomplishing this purpose in hand-rakes of the large size, now in common use, is to lift the rake from the ground. This process is laborious and fatiguing, and is, besides, slow.

In horse-rakes a revolving head with two sets of teeth has been much employed. With my invention a single set of teeth only is used. My invention is designed to obviate these difficulties.

In the accompanying drawings, A shows the lever or frame attached to the handle; B, the connecting-rod by which its motion is communicated to the rake-head or the teeth. This frame A is composed of five pieces—the two side pieces, $a\,a$, the two end portions, $b\,b'$, and the center piece, $c$. The center piece, $c$, forms the pivot on which the frame turns, and it passes through the handle of the rake. The end $b$ forms a hand-piece, by which the device is operated. To the end piece $b'$ is attached the arm B by a joint. By grasping the hand-piece $b$ the frame can be turned to the position indicated by the red line 1 in Fig. 1 and back while the rake is kept moving. The arm B communicates with the standard C, rigidly attached to the rake-head, and is connected to this standard by a joint, as clearly shown in the drawings. By this device the rake-head may be turned to the position shown by the red line 2 in Fig. 1 and back. Instead of the frame A may be substituted a single lever or upright arm turning on the piece $c$ and fitted with a handle.

The rake-head is connected with the handle or tongue by means of a joint, hinge, or band, so as to admit of its motions as described. This is seen at D.

The object of the frame A, connecting-rod B, and arm C is to turn the head of the rake when in use, in order to relieve it of its load, deposit the hay in any desired place, and again restore the rake-head to the position illustrated in Fig. 1.

I am aware of the existence of Letters Patent numbered 29,012, and dated July 3, 1860, being for an invention entitled "an improvement in horse-rakes," and consisting in arranging a pressure-bar extending across the rake-teeth to hold them down, and placed in a certain position to give increased support and steadiness to the teeth.

My invention does not contemplate such object, and I do not claim the combination of a rocking frame supporting the rake with a spring-pressure bar extending across the rake-teeth and bearing upon them for the said purpose.

I am also aware of Letters Patent numbered 29,795, and dated August 28, 1860, and combining a hand-lever, spring-latch, semicircular slotted rack, and connecting-bar; but this invention is different from mine in the devices employed and in its method of operation, inasmuch as my invention does not employ a spring-latch or semicircular slotted rack, and also in the construction and operation of the rake-head.

Letters Patent numbered 41,433 claim the combination of a rocking frame and jointed bearings for the rake-teeth. I do not claim such a combination.

In my invention the teeth are rigidly inserted into the rake-head and are turned only as the rake-head is turned.

What I claim as my invention, and desire to secure by Letters Patent, is—

The combination and arrangement of the frame A, connecting-rod B, arm C, and hinges or bands D, attached to the tongue and head of a rake, as herein set forth, and operating as and for the purposes described.

HIRAM BROWN.

Witnesses:
WILLIAM H. CLIFFORD,
HENRY C. HOUSTON.